(12) United States Patent
Düppre

(10) Patent No.: US 12,209,976 B2
(45) Date of Patent: Jan. 28, 2025

(54) INSPECTION DEVICE WITH INTEGRATED X-RAY AND WEIGHING DEVICE

(71) Applicant: Wipotec GmbH, Kaiserslautern (DE)

(72) Inventor: Theo Düppre, Kaiserslautern (DE)

(73) Assignee: Wipotec GmbH, Kaiserslautern (DE)

( * ) Notice: Subject to any disclaimer, the term of this patent is extended or adjusted under 35 U.S.C. 154(b) by 0 days.

(21) Appl. No.: 18/144,784

(22) Filed: May 8, 2023

(65) Prior Publication Data

US 2024/0027370 A1    Jan. 25, 2024

(30) Foreign Application Priority Data

May 9, 2022    (DE) ...................... 10 2022 111 511.9

(51) Int. Cl.
| | |
|---|---|
| *G01N 23/083* | (2018.01) |
| *B07C 5/18* | (2006.01) |
| *B07C 5/34* | (2006.01) |
| *G01G 11/00* | (2006.01) |
| *G01N 23/04* | (2018.01) |

(52) U.S. Cl.
CPC ............ *G01N 23/083* (2013.01); *B07C 5/18* (2013.01); *B07C 5/3416* (2013.01); *G01G 11/003* (2013.01); *G01N 23/04* (2013.01); *G01N 2223/643* (2013.01)

(58) Field of Classification Search
CPC ...... B07C 5/18; B07C 5/3416; G01N 23/083; G01N 23/04; G01N 2223/643; G01G 11/003
See application file for complete search history.

(56) References Cited

U.S. PATENT DOCUMENTS

| | | |
|---|---|---|
| 2008/0232541 A1 | 9/2008 | Kang |
| 2014/0249663 A1 | 9/2014 | Voillaume |
| 2016/0349102 A1 | 12/2016 | Troisi |

FOREIGN PATENT DOCUMENTS

| | | |
|---|---|---|
| CN | 110631677 A | 12/2019 |
| CN | 214151090 U | 9/2021 |

(Continued)

OTHER PUBLICATIONS

Extended European Search Report issued Sep. 7, 2023 in EP Application No. 23171543.4.

(Continued)

*Primary Examiner* — Michael McCullough
*Assistant Examiner* — Kalyanavenkateshware Kumar
(74) *Attorney, Agent, or Firm* — Calvert Technology Law, PLLC; Nathan H. Calvert

(57) ABSTRACT

An inspection device in a radiation protection housing comprises an electromagnetic radiation-based inspection device, especially an X-ray device and a weighing device. The inspection device an endless conveyor belt for transporting products in a transport direction from an entry region to an inspection region, from there to a region for weighing, and from there to an exit region of the inspection device. An upper run of the endless conveyor belt in its path from the region for weighing to the exit region, traverses a height difference in in a height direction by means of an inclined region. The conveyor belt circulates around at least part of the inclined region and the weighing device, looking in the transport direction, is disposed immediately in front of the inclined region in the inspection device.

11 Claims, 2 Drawing Sheets

(56) References Cited

FOREIGN PATENT DOCUMENTS

| | | | |
|---|---|---|---|
| DE | 102007032270 A1 | 1/2009 | |
| EP | 1923147 A1 * | 5/2008 | ........... B07B 13/003 |
| EP | 3098578 A1 * | 11/2016 | ............... B07C 5/18 |
| JP | H0949883 A | 2/1997 | |
| JP | 201071669 A | 4/2010 | |
| JP | 201175508 A | 4/2011 | |
| JP | 2011202979 A | 10/2011 | |

OTHER PUBLICATIONS

Japanese Office Action issued Apr. 5, 2024 in JP application No. JP2023-076152.

* cited by examiner

INSPECTION DEVICE WITH INTEGRATED X-RAY AND WEIGHING DEVICE

TECHNICAL FIELD OF THE INVENTION

The invention concerns an inspection device having both a weighing device and an electromagnetic radiation-based inspection device, in particular an X-ray device, within a radiation protection housing.

BACKGROUND OF THE INVENTION

Electromagnetic radiation-based inspection devices (that is, devices for inspection by means of electromagnetic radiation) and weighing devices are used, for example, in the food industry as well as in the pharmaceuticals industry, wherein even unpackaged products are checked for flawless quality and weight.

Such an inspection of products usually takes place in a production line, wherein special protection measures must be provided, in particular for X-ray inspection.

Especially in the case of light-weight products and for environmental safety reasons the provision of heavy radiation protecting curtains made of materials such as lead or the like is problematic. Apart from the undesirable use of certain materials, there is also the danger that the products being transported on a conveyor belt will be shifted in position and this shifting of position may lead to erroneous inspection results.

Moreover, an undesirable shift of product position in a production line can also lead to problems in the further processing of the products, for example during the application of labels.

SUMMARY OF THE INVENTION

An object of the present invention is to provide an inspection device, that avoids the above-noted problems and others and enables both an inspection by means of electromagnetic radiation, for example X-ray inspection, and a weighing of products (packaged, unpackaged, or packaged in containers that are still open), wherein the inspection results have high precision and erroneous results are avoided.

Since an inspection device in accordance with some embodiments of the present invention comprises both an electromagnetic radiation-based inspection device, in particular an X-ray device, and also a weighing device, the inspection device may advantageously have a short structural form in the x direction (direction of transport).

The presence of an electromagnetic radiation-based inspection device, in particular an X-ray device, in front of a weighing device (in the direction of transport) serves as a stabilizing zone for the travel of the conveyor belt and possibly the product, so that in the region of the weighing device the belt travels more smoothly and the risk of belt flutter is reduced and a shorter structural form (or shorter structural length) of the overall device is enabled.

In order to enable high precision weighing results while still having sufficient radiation protection, embodiments of the inspection device may have on its exit side an inclined region and a weighing device, with the weighing device being disposed immediately in front of the inclined region with respect to the direction of transport. The inclined region is preferably made as a plate, in particular as bent sheet metal. Of course, the inclined region may alternatively or additionally be formed by at least one roller or may comprise part of the conveyor belt path through the inspection device.

The conveyor belt in some embodiments of the invention is guided over the inclined region (while taking into consideration the elasticity of the belt) and pulled down over the inclined region. This arrangement causes the belt to have a uniform course of travel without movement (lifting) in the z direction (height) in the region of the weighing device, that is, the region immediately in front of the inclined region.

Due to the higher (although negligible) belt tension by comparison with the belt regions lying upstream, an undesirable belt flutter or bulging (in front of the deflection site for the inclined region, or the change of direction of the belt) can be avoided. This partial pulling, at least in the region of the weighing device, may be enhanced through the geometry of the belt guide, through the appropriate arrangement of a drive roller, in particular a traction roller, closer to the region of the weighing device and/or by the corresponding rollers upstream in the production flow (in front of the weighing device) and/or upstream belt guides with braking action (slowing). Preferably in the transport direction the belt zone from the weighing device to an exit side drive roller may be shorter than the belt zone from the drive roller to the weighing device (belt geometry).

Because the course of the belt, as explained above, may be designed so that the belt is pulled not only in the region of the weighing device, but rather also preferably in the region of the electromagnetic radiation-based inspection device (in the transport direction), in particular an X-ray device, bulging, stretching, etc., in the belt guide of the X-ray device can also advantageously be avoided. Otherwise, such effects can have an adverse effect on the synchronicity and quality of the acquired images, especially lines per unit of time and length, in an inspection by an electromagnetic radiation-based inspection device.

The conveyor belt in some embodiments is driven with a defined velocity program, in particular at a constant velocity, in order to enable the operation of the electromagnetic radiation-based inspection device (in the transport direction), in particular an X-ray device with an inexpensive line-scan camera, which requires a defined value of lines per unit of time.

The inclined region may be disposed in the inspection device so that its weight is not taken into account in the weighing of a just irradiated/inspected product. Correspondingly, when the weighing device is disposed in the immediate vicinity of the inclined region between a load-detecting part of the weighing device and the inclined region, there is no (tractive) connection, so that the dead weight of the inclined region remains unconsidered in weighing.

Moreover, the guiding of the belt over the inclined region keeps the weighing of a product in front of said inclined region from being affected by any possible vertical force components of the belt path.

To avoid belt crossings and the accompanying greater cleaning expense embodiments may include a common endless conveyor belt that circulates around the electromagnetic radiation-based inspection device (in the transport direction), the weighing device, and at least part of the inclined region.

The escape of X-ray radiation (or another hazardous radiation such as terahertz radiation) from the radiation protection housing is avoided through the inclined region, even without an additional radiation curtain. Through this arrangement of the inclined region, the otherwise necessary radiation protection curtains and thus their problems such as soiling and sealing are eliminated. Correspondingly, one can eliminate cleaning and abrasion monitoring of the radiation protection curtains, in particular lead curtains.

Even the escape of radiation due to reflection from the radiation protection housing is sufficiently prevented by the exit region or exit opening, which lies lower (or higher) than the X-ray inspection belt level in the height direction.

Here it should be noted that the electromagnetic radiation-based inspection device (with it's electromagnetic radiation source) is not situated in the immediate vicinity of the exit region due to its upstream position (in the transport direction) in front of the weighing device.

However, a radiation protection housing is frequently needed even in the case of other electromagnetic radiation-based inspections, for example using an optical camera (with visible light, infrared, UV, etc.), for example to prevent entry of foreign light or foreign radiation. In this case, instead of the escape of radiation, the entry of radiation into a corresponding detector is similarly prevented.

It is particularly advantageous, especially for light/dark adjustment of a camera, to screen out undesirable foreign light (against entry) by means of a radiation protection housing.

According to some embodiments of the invention, the inclined region causes the upper run of the endless belt to overcome (traverse) a large difference in the z direction (height direction) in its path from the region for weighing to the exit region. The level of the exit region can be matched to different factors in this way.

In some embodiments of the invention the weighing device is made as a module in order to be able to insert it into the inspection device and remove it therefrom as a unit. In this case at least part of the inclined region is formed by an integral component fixed in place on the modular weighing device. This part may be made as a plate, in particular as bent sheet metal. Of course, it is also possible within the scope of the invention to form this part of the inclined region with, for example, one, two, or more rollers.

Through the modular, integrated design it is possible to make the section preadjusted to the weighing device at the factory, so that an otherwise necessary adjustment when installing the module can be omitted.

Through this pre-adjustment it can be ensured that the highest point of the section in the z direction (height direction) is aligned to the highest point of the weighing device or its weighing platform, or is slightly above it, so that the vertical components of the belt guide do not directly affect the weighing of a product.

Moreover, maintenance, cleaning, repair, etc., of the device are made easier, since these operations can take place apart from a release of tension or removal of the belt without disassembly of an already installed system.

In some embodiments of the invention the section of the inclined region is disposed on the weighing device so that its weight is not taken into account in the weighing of a previously irradiated/inspected product. For example, the inclined region can be disposed on the (fixed) frame region of the weighing device or on the weighing cell itself, so that a load-detecting region of the weighing device remains unaffected thereby.

Also, the drive for the belt may be installed on the frame, so that the drive does not have to be considered as a preload upon weighing.

In some embodiments of the invention at least part of the inclined region is made as a component of sorter. Such a sorter can in this case be made as a separate conveyor belt or as a simple chute.

Through this sorter arrangement, the inspection device can, for example, eject flawed products or sort different inspection results without needing to provide a special ejecting or sorting device in the production line. For example, embodiments of the invention may include a sorter in the form of a flapper mechanism acting in the z direction (in particular a fold-up or fold-down flapper with pivot axis in the y direction, that is, width direction).

Such a sorter can also be a component of the radiation protection. For example, for light/dark adjustment of a camera the sorter can, in a specific pivot position, additionally contribute to preventing entry of foreign light.

In some embodiments of the invention the weighing device comprises at least one weighing cell and at least one weighing platform, the latter being preferably made as a bent sheet metal part. It is also possible here to provide several weighing cells per platform. A plurality of weighing platforms can be provided both adjacent in the x direction (transport direction) and adjacent in the y direction (belt width). In this way an exact weighing of products of different sizes on a plurality of platforms as well as multi-track weighing can be enabled.

Some embodiments of the invention may include a belt alignment unit fixed in place on the modular weighing device as an integral component upstream (with respect to product) in front of the weighing platform and aligned with it.

Through this belt alignment unit arrangement, a negative effect of any irregularity of the belt guide that has its origin upstream from the region of the weighing device can be precluded.

In some embodiments of the invention, the upper run of the endless belt, in its path from the entry region to the region for electromagnetic radiation-based inspection, overcomes a large difference in the z direction (height direction), wherein the upper run in this region is preferably made as an entry ramp. In this way the level of the entry region and the level of the exit region can be matched to different circumstances.

The entry region and exit region of the inspection device in some embodiments preferably have essentially the same height in the z direction (height direction), so that the inspection device can be used in production lines situated at the same level without changing the level.

According to one aspect of the invention, an electromagnetic radiation-based inspection device thus a radiation source, and a radiation detector, preferably a line-scan camera, and a weighing device, especially a weighing platform, are situated within a radiation protection housing and thus integrated into the inspection device.

The radiation can penetrate the products or be reflected by the product through an electromagnetic radiation-based inspection device.

Of course, it is also possible to integrate other additional inspection units, for example metal detectors, an optical inspection device (for control of printing or labeling, a tightness tester) into such an inspection device within the scope of the present invention.

The power supply to and signal transmission for the electromagnetic radiation-based inspection device and the weighing device take place in a known way. Of course, corresponding analysis units for the electromagnetic radiation-based inspection and weighing of the products can be situated outside of the radiation protection housing, wherein signal transmission to these analysis units can take place via a cable (electrical, optical) or wirelessly.

These and other aspects, advantages, and features of the invention will be apparent from the following description of representative embodiments, considered along with the accompanying drawings.

DESCRIPTION OF REPRESENTATIVE EMBODIMENTS

Figure 1:
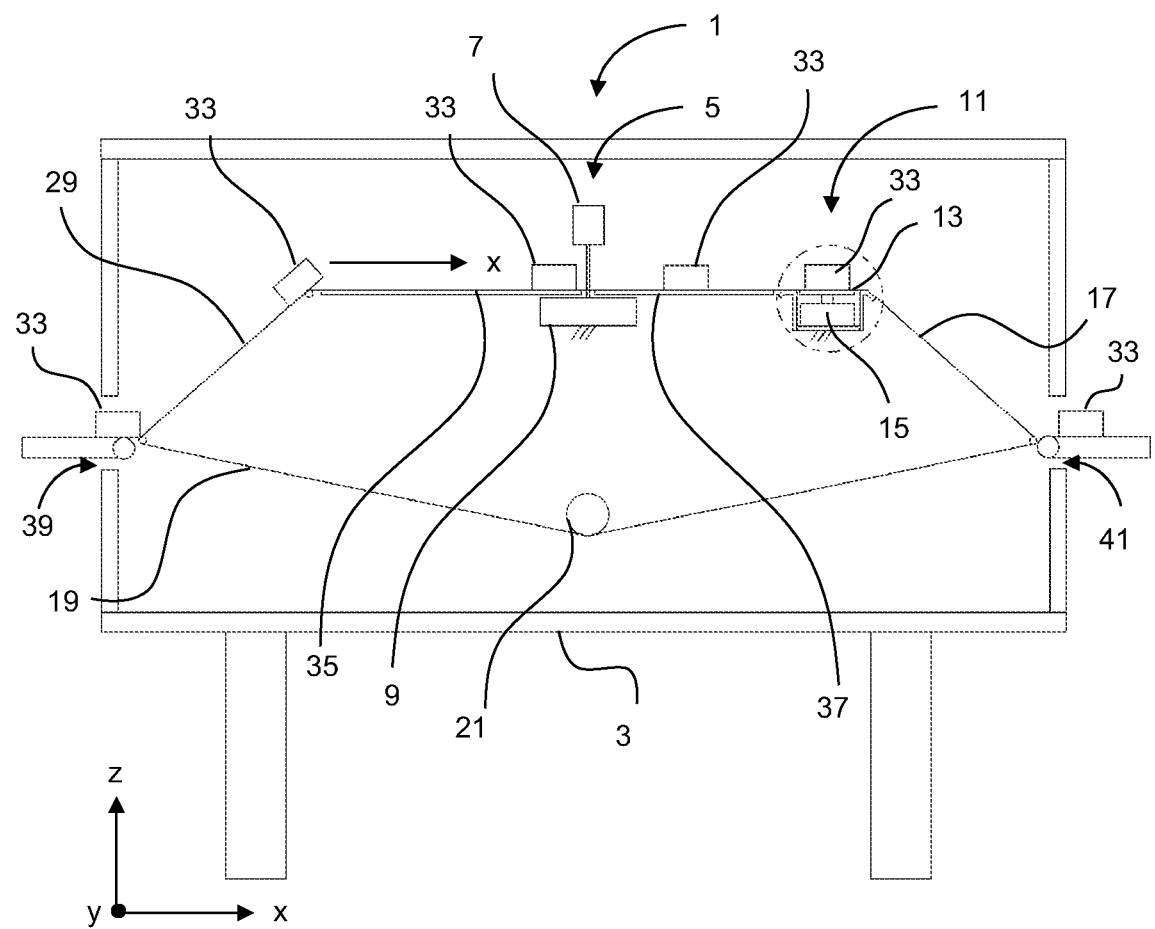
FIG. 1 shows a schematic view of a first embodiment of an inspection device according to the invention.

The schematic side view of FIG. 1 shows an inspection device 1 having a radiation protection housing 3 with the front wall removed to expose the interior region of the housing. In fact, however, the radiation protection housing 3 is a closed housing with the exception of openings for an entry region 39 and an exit region 41. The openings in the radiation protection housing 3 for the entry region 39 and the exit region 41 are preferably kept as small as possible, depending on the height and width of the product, so that optimum radiation protection is enabled while at the same time transporting the products 33.

Products 33 are transported, in a manner not shown in detail, through the entry region 39 into the inspection device 1 and leave the inspection device 1 through the exit region 41.

Figure 3:
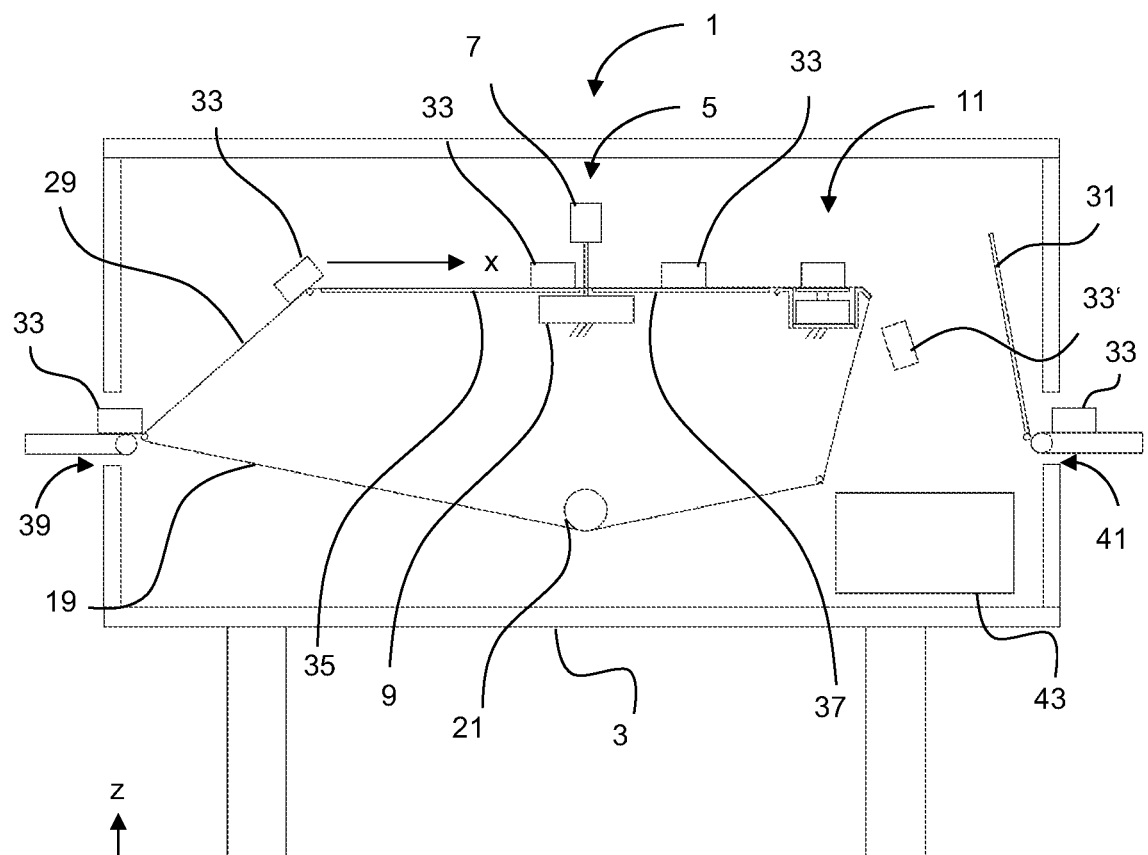
FIG. 3 shows a schematic view of a second embodiment of an inspection device according to the invention with an ejector.

As shown in FIGS. 1 and 3, entry region 39 and exit region 41 are at the same height in the z direction/height direction. At the entry region 39 a product 33 is transported over an upwardly inclined entry ramp 29 onto a horizontal plane by means of a circulating endless belt 19.

On this horizontal plane the belt and products situated on it are supported over its width (extending in the y direction (width direction) perpendicular to the plane of the drawing sheet) by means of belt guide elements 35 and 37, which extend in the y direction and in the x direction/transport direction, up to and after an X-ray device 5.

The X-ray device 5 comprises an X-ray source 7 above the upper run of the belt 19 and an X-ray detector 9 under the upper run vertically under the X-ray source 7, so that products 33 situated on the belt 19 are exposed to radiation from X-ray source 7. The X-ray radiation penetrates the product 33 and the belt 19 and then passes through a gap between belt guide elements 35 and 37 and strikes the X-ray detector 9, which is preferably made as a line-scan camera.

Of course, it is also possible for X-ray source and X-ray detector to be positioned in the reverse arrangement with the X-ray source below the upper run of belt 19 and the X-ray detector above belt 19 and product 33 carried thereon.

In its travel from entry region 39 to exit region 41, the product 33 follows a trapezoidal path in the plane of the drawing sheet. After passing through the X-ray device the product 33, supported by the guide element 37, is transported to a weighing device 11, which is preferably designed as a weighing cell 15 with a load-detecting weighing platform 13.

The weighing platform 13, for example a bent sheet metal part, abuts the underside of the belt 19, so that the weight or gravitational force of the product 33 in this region of the upper run of belt 19 is detected by the weighing device 11.

Figure 2:
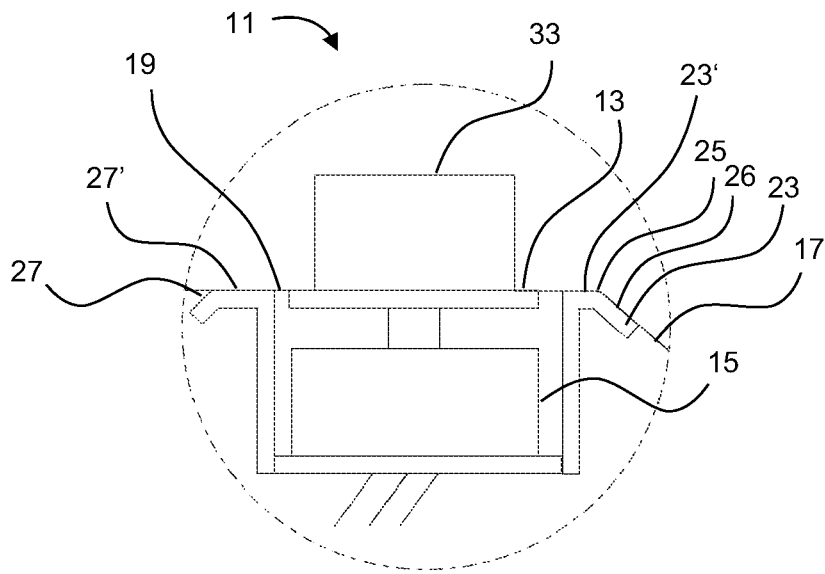
FIG. 2 shows a detailed view from FIG. 1.

Moreover, the weighing cell 15 is, as can be seen particularly from the detail view of FIG. 2, itself disposed on a fixed frame comprising a bottom frame part and front and rear frame parts all supported in a fixed position as schematically represented by the three slanted lines at the bottom of the illustrated weighing device 11.

The power supply and signal transmission from the X-ray device 5 and weighing device 11 take place in a manner that is known and not shown in the drawing. Of course, the appropriate analysis units for the X-rays and weighing of products 33 can be located outside the radiation protection housing 3, wherein the signal transmission to these analysis units can take place via cable (electrically, optically) or even wirelessly.

After being weighed, the product 33 is transported over inclined region 17 from the elevated horizontal side of the trapezoid downward to the exit region 41 and leaves the inspection device 1 via the exit region 41. Thus a product path through inspection device 1 runs from entry region 39, then along inclined entry ramp 29, then to an electromagnetic radiation inspection region of an electromagnetic radiation-based inspection device (in this case X-ray device 5), then to a weighing region of weighing device 11, then along inclined region 17, and then to exit region 41. As is apparent in the example of FIG. 1, the height dimension of entry region 39 defines a maximum product height of products 33 (that is, the dimension of the products 33 in the z direction of the figures). This example inspection device 1 also shows that the inclined entry ramp 29 traverses an entry height difference in the z/height direction that is greater than the product maximum height defined by entry region 39. Similarly, the example of FIG. 1 shows that the inclined region 17 adjacent to exit region 41 traverses an exit height difference greater than the product maximum height defined by entry region 39.

The delivery and removal of the products to the entry region 39 and from the exit region 41 is shown schematically in FIGS. 1 and 3 as an example for a production line with the corresponding ends of the production line conveyor belt connecting to the entry region 39 and exit region 41. However, it is also possible within the scope of the present invention to operate the inspection device as such as a freestanding device, wherein entry region 39 and exit region 41 are operated in a different way or products 33 are delivered and removed differently.

As can be seen from FIG. 1, belt 19 is driven in the lower run by a drive roller 21, in particular a tension roller or a traction roller. The drive roller 21 can be disposed centrally with respect to the overall belt path as shown, or at a different place. In the illustrated example of FIG. 1, the belt zone from weighing device 11 to drive roller 21 (exit side) is shorter in the belt direction than the belt zone from drive roller 21 to weighing device 11 (belt geometry). With this arrangement of weighing device 11 and drive roller 21, the pulling of a product 33 over the weighing platform 13 and the inclined region 17 is additionally supported, so that the belt tension over the weighing platform 13 and the inclined region 17 becomes additionally higher than in the region after the drive roller 21.

Due to the pulling of belt 19 provided by drive roller 21, which is possibly additionally increased by the belt geometry that was explained above, the belt 19 being pulled downward over the inclined region 17 abuts the deflection point 25 (see FIG. 2) so that lifting of belt 19 or even fluttering or bulging is avoided.

The weighing device, in particular its weighing platform 13, as can be seen from all of the figures, is arranged in the belt direction in the immediate vicinity of the inclined region 17 and thus its deflection point 25 (labeled only in FIG. 2), so that the load detector of the weighing device, in particular the weighing platform 13 and deflection point 25, are aligned with each other in the height direction.

The problems noted above (lifting of the belt, fluttering, bulging, etc.) are thus also precluded on the weighing platform 13, so that erroneous results caused in this regard can be avoided during weighing.

Because the course of the belt 19 is designed so that the belt is pulled not only in the region of the weighing device 11, but rather preferably also in the region of the X-ray device 5, bulging, stretching, etc., in the belt guide, which have an adverse effect on the synchronicity of the acquired images, in particular lines per unit of time and length during X-ray analysis, can advantageously be avoided in the X-ray device. Negative effects on image quality can be prevented in this way.

As can be seen from FIG. 2, the belt guide in a part of the inclined region 17 is made as a section 23, preferably a bent metal sheet. Section 23 thus includes the deflection point 25, which of course can also be made rounded instead of with a sharp edge. On the belt side in front of deflection point 25 section 23 preferably has a horizontal region 23', which aligns, like deflection point 25, with weighing platform 13 in the height direction. Downstream of deflection point 25 in the transport direction x, section 23 includes an inclined part 26 that serves as an outlet ramp component of weighing device 11.

Section 23 is secured directly to the frame holding the weighing cell 15 and preferably is integrated into weighing device 11, which is designed to be insertable and exchangeable as a module (that is, as a unit). The precise adjustment of section 23, so that the deflection point 25 (the peripheral edge extending in the y direction/width direction) and the optionally connecting horizontal region 23' aligns with the weighing platform 13, can in this case take place at the factory in the manufacturing process without such fine adjustment needing to be undertaken when the module is installed in the inspection device (production, maintenance, cleaning, replacement, etc.)

As shown in FIG. 2, a belt guide unit 27, which has a horizontal region 27', which likewise aligns with the weighing platform 13 in the height direction, can be provided in the belt guide in front of the weighing platform 13. In front of this horizontal region 27' there can be an inclined region, which serves as a ramp guiding the belt 19 upward.

The belt guide unit 27 can, like section 23, likewise be secured directly to a fixed frame of the weighing cell 15 and preferably can be integrated into the weighing device 11, which is designed to be insertable and exchangeable as a module. The precise adjustment of the belt guide unit 27 so that its horizontal region 27' aligns with the weighing platform 13, can take place at the factory during production without such fine adjustment having to be undertaken in the installation of the module in the inspection device (production, maintenance, cleaning, replacement, etc.)

The second embodiment, shown in FIG. 3, is identical to the first embodiment example in FIG. 1 except for the differences explained below, so that the relevant passages describing FIGS. 1 and 2 also apply here.

In contrast to the first embodiment, the second embodiment shown in FIG. 3 has an ejector/sorter. The inclined region 17 (from FIG. 1) in this case ends with section 23. Its continuation in the direction of exit region 41 is made in part as a pivot region 31 of the ejector/sorter, for example in the form of a plate, which has a pivot axis aligned in the y direction/width direction lying perpendicular to the plane of viewing in the region of exit 41.

In the case of a negative inspection result (X-ray and/or weighing) the pivot region 31, as shown in FIG. 3, can be pivoted upward, so that a product (33') to be sorted out falls into a receiver 43 situated below.

On the other hand, products 33 that pass inspection or are not to be sorted out, are transported to the exit region via pivot region 31, which is in a closed or not pivoted upward position, in which pivot region 31 is aligned with section 23 (wherein a seam or gap may be located between them).

Pivot region 31 can in this case be designed as a separate belt conveyor or as a simple chute. In the case shown in FIG. 3 pivot region 31 does not lie in the circulation path of belt 19, so that the course of belt 19 is not affected by the ejector/sorter.

Even though in the two embodiments an X-ray device in the form of a device for inspection by means of electromagnetic radiation was illustrated, these embodiments can easily be employed for other devices for inspection by means of electromagnetic radiation (also with visible light, infrared, UV, terahertz, etc.). Of course, if reflection is employed, it is not necessary that the radiation source and detector be arranged on opposite sides of a product (as shown, above and below, or even laterally), but rather are arranged, for example, on the same side of the product.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

The directions referenced herein and in the following claims, namely, the x or transport direction, the z or height direction, and the y or width direction refer to the corresponding directions indicated in the drawings relative to the inspection device 1 as oriented therein.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE NUMBERS 1 inspection device
3 radiation protection housing
5 X-ray device
7 X-ray source
9 X-ray detector
11 weighing device
13 weighing platform (or load detector in the form of a weighing platform)
15 weighing cell
17 inclined region
19 endless belt
21 drive roller tension roller/traction roller
23 section of inclined region
23' horizontal region of section 23
25 deflection point of inclined region
26 inclined part of section 23.
27 belt guide unit
27' horizontal zone of belt guide unit
29 entry ramp
31 pivot region of ejector/sorter
33 products
33' product to be sorted out
35 belt guide element
37 belt guide element
39 entry region
41 exit region
43 collecting receiver
X transport direction
Y direction perpendicular to plane of drawing (direction of width)
Z direction of height

The invention claimed is:

1. An inspection device including:
(a) a radiation protection housing;
(b) an electromagnetic radiation-based inspection device;
(c) a weighing device;
(d) a conveyor operable to transport products in a transport direction along a product path through the inspection device from an entry region, then to an electromagnetic radiation inspection region of the electromagnetic radiation-based inspection device, then to a weighing region of the weighing device, and then to an exit region;
(e) wherein the product path from the weighing region to the exit region includes an inclined region that traverses an exit height difference in a height direction which extends orthogonal to both the transport direction and a width direction of the inspection device;
(f) wherein the conveyor includes a conveyor belt that circulates along the product path through both the electromagnetic radiation inspection region of the electromagnetic radiation-based inspection device and the weighing region of the weighing device and also circulates around at least part of the inclined region; and
(g) wherein the weighing region is disposed immediately in front of the inclined region in the transport direction: wherein the weighing device comprises a weighing module that is insertable as a unit into the inspection device and removable as a unit from the inspection device, and wherein at least part of the inclined region is defined by a weighing module outlet ramp component fixed in place on the weighing module.

2. The inspection device of claim 1 wherein at least some of the inclined region is located within the radiation protection housing.

3. The inspection device of claim 1 wherein the weighing module includes a weighing platform for receiving a product to be weighed and wherein the weighing module outlet ramp component is isolated from the weighing platform.

4. The inspection device of claim 1 wherein at least part of the inclined region is defined by a component of a sorting device.

5. The inspection device of claim 1 wherein the weighing device includes a weighing cell and a weighing platform.

6. The inspection device of claim 5 wherein the weighing device further includes a belt guide unit aligned with the weighing platform in a fixed position on the weighing device at an upstream location relative to the weighing platform.

7. The inspection device of claim 1 wherein the product path from the entry region to the electromagnetic radiation inspection region represents an entry ramp that traverses an entry height difference in the height direction.

8. The inspection device of claim 7 wherein the entry height difference is greater than a product maximum height in the height direction.

9. The inspection device of claim 8 wherein the exit height difference is greater than the product maximum height in the height direction.

10. The inspection device of claim 1 wherein the exit height difference is greater than a product maximum height in the height direction.

11. The inspection device of claim 1 wherein the entry region and exit region are substantially aligned in the height direction.

* * * * *